(12) United States Patent
Giessler-Blank et al.

(10) Patent No.: US 8,431,646 B2
(45) Date of Patent: Apr. 30, 2013

(54) MIXTURE CONTAINING ORGANOSILICON COMPOUND AND USE THEREOF

(75) Inventors: Sabine Giessler-Blank, Dortmund (DE); Burkhard Standke, Loerrach (DE); Ulf Kehrer, Hattersheim (DE)

(73) Assignees: Evonik Degussa GmbH, Essen (DE); Akzo Nobel N.V., Arnhem (NL)

( * ) Notice: Subject to any disclaimer, the term of this patent is extended or adjusted under 35 U.S.C. 154(b) by 672 days.

(21) Appl. No.: 12/596,725

(22) PCT Filed: Mar. 7, 2008

(86) PCT No.: PCT/EP2008/052755
§ 371 (c)(1), (2), (4) Date: Oct. 20, 2009

(87) PCT Pub. No.: WO2008/128819
PCT Pub. Date: Oct. 30, 2008

(65) Prior Publication Data
US 2010/0119851 A1    May 13, 2010

(30) Foreign Application Priority Data
Apr. 20, 2007    (EP) .................................... 07106619

(51) Int. Cl.
*C08L 83/04* (2006.01)

(52) U.S. Cl.
USPC .......................................... 524/588; 525/474

(58) Field of Classification Search .................. 525/474; 524/588
See application file for complete search history.

(56) References Cited

U.S. PATENT DOCUMENTS

| | | | |
|---|---|---|---|
| 4,226,793 A | 10/1980 | Kotzsch et al. |
| 4,321,401 A | 3/1982 | Nestler et al. |
| 4,704,416 A | 11/1987 | Eck et al. |
| 5,306,856 A | 4/1994 | Streck et al. |
| 5,591,818 A | 1/1997 | Standke et al. |
| 5,629,400 A | 5/1997 | Standke et al. |
| 5,679,147 A | 10/1997 | Standke et al. |
| 5,744,675 A | 4/1998 | Fiolitakis et al. |
| 5,766,323 A | 6/1998 | Butler et al. |
| 5,808,125 A | 9/1998 | Standke et al. |
| 5,849,942 A | 12/1998 | Standke et al. |
| 5,863,509 A | 1/1999 | Standke et al. |
| 5,885,341 A | 3/1999 | Standke et al. |
| 5,932,757 A | 8/1999 | Standke et al. |
| 6,020,448 A | 2/2000 | Jenkner et al. |
| 6,054,601 A | 4/2000 | Standke et al. |
| 6,118,015 A | 9/2000 | Haas et al. |
| 6,133,466 A | 10/2000 | Edelmann et al. |
| 6,139,622 A | 10/2000 | Gobel et al. |
| 6,176,918 B1 | 1/2001 | Glausch et al. |
| 6,177,582 B1 | 1/2001 | Jenkner et al. |
| 6,201,093 B1 | 3/2001 | Messner et al. |
| 6,228,936 B1 | 5/2001 | Standke et al. |
| 6,239,194 B1 | 5/2001 | Standke et al. |
| 6,251,989 B1 | 6/2001 | Edelmann et al. |
| 6,255,513 B1 | 7/2001 | Standke et al. |
| 6,261,355 B1 * | 7/2001 | Kassem et al. ............. 106/172.1 |
| 6,288,256 B1 | 9/2001 | Standke et al. |
| 6,361,871 B1 | 3/2002 | Jenkner et al. |
| 6,395,858 B1 | 5/2002 | Mack et al. |
| 6,403,228 B1 | 6/2002 | Mack et al. |
| 6,491,838 B1 | 12/2002 | Standke et al. |
| 6,500,883 B1 | 12/2002 | Mack et al. |
| 6,528,585 B1 | 3/2003 | Standke et al. |
| 6,534,667 B1 | 3/2003 | Standke et al. |
| 6,641,870 B2 | 11/2003 | Bartkowiak et al. |
| 6,663,683 B2 | 12/2003 | Lortz et al. |
| 6,676,719 B2 | 1/2004 | Lortz et al. |
| 6,685,766 B2 | 2/2004 | Standke et al. |
| 6,689,468 B2 | 2/2004 | Edelmann et al. |
| 6,695,904 B2 | 2/2004 | Burger et al. |
| 6,699,586 B2 | 3/2004 | Edelmann et al. |
| 6,713,186 B1 | 3/2004 | Jenkner et al. |
| 6,767,377 B2 | 7/2004 | Schumacher et al. |
| 6,767,982 B2 | 7/2004 | Standke et al. |
| 6,770,327 B2 | 8/2004 | Edelmann et al. |
| 6,773,697 B2 | 8/2004 | Hemme et al. |

(Continued)

FOREIGN PATENT DOCUMENTS

| | | |
|---|---|---|
| DE | 280 9871 | 9/1979 |
| DE | 197 42 974 | 12/1998 |

(Continued)

*Primary Examiner* — Kuo-Liang Peng
(74) *Attorney, Agent, or Firm* — Oblon, Spivak, McClelland, Maier & Neustadt, L.L.P.

(57) ABSTRACT

The present invention relates to the use of a mixture that is dispersible, redispersible, or soluble in water, or an aqueous composition for protecting substrates from corrosion, wherein the mixture, or the composition, is based on at least one organic polymer that is soluble in water and at least one organosilicon compound. The invention further relates to a mixture that is dispersible, redispersible, or soluble in water, based on at least one organic polymer that is soluble in water and at least one organosilicon compound having at least one Si—O—Si bond and/or at least one Si—Si bond, wherein either the content of the organic polymer soluble in water, based on the sum of the organic polymer soluble in water and of the organosilicon compound, is between about 40 and about 80 wt.-%, or the organosilicon compound is an oligomer mixture of alkyl alkoxy siloxanes, wherein the oligomer mixture contains 50 to 100 wt.-% of alkyl alkoxy siloxanes, and the same have a degree of oligomerization of 2 to 20. The invention further provides a method for the production of mixtures according to the invention and the use thereof.

19 Claims, 2 Drawing Sheets

U.S. PATENT DOCUMENTS

| | | |
|---|---|---|
| 6,773,814 B2 | 8/2004 | Schumacher et al. |
| 6,808,769 B2 | 10/2004 | Batz-Sohn et al. |
| 6,830,816 B2 | 12/2004 | Mehnert et al. |
| 6,841,197 B2 | 1/2005 | Standke et al. |
| 6,858,746 B2 | 2/2005 | Giessler et al. |
| 6,864,323 B2 | 3/2005 | Schlosser et al. |
| 6,905,632 B2 | 6/2005 | Lortz et al. |
| 6,946,537 B2 | 9/2005 | Krafczyk et al. |
| 6,991,190 B2 | 1/2006 | Lortz et al. |
| 7,015,270 B2 | 3/2006 | Scharfe et al. |
| 7,026,398 B2 | 4/2006 | Monkiewicz et al. |
| 7,083,769 B2 | 8/2006 | Moerters et al. |
| 7,244,302 B2 | 7/2007 | Schumacher et al. |
| 7,255,735 B2 | 8/2007 | Meyer et al. |
| 7,374,787 B2 | 5/2008 | Lortz et al. |
| 7,399,487 B2 | 7/2008 | Batz-Sohn et al. |
| 7,423,165 B2 | 9/2008 | Korth et al. |
| 7,427,442 B2 | 9/2008 | Albert et al. |
| 7,470,423 B2 | 12/2008 | Lortz et al. |
| 7,538,142 B2 | 5/2009 | Lortz et al. |
| 7,572,854 B2 | 8/2009 | Schneider et al. |
| 7,578,877 B2 | 8/2009 | Giessler et al. |
| 7,598,409 B2 | 10/2009 | Just et al. |
| 7,615,577 B2 | 11/2009 | Lortz et al. |
| 7,625,975 B2 | 12/2009 | Barfurth et al. |
| 7,645,335 B2 | 1/2010 | Lortz et al. |
| 7,749,322 B2 | 7/2010 | Schumacher et al. |
| 7,780,777 B2 | 8/2010 | Perlet et al. |
| 7,815,936 B2 | 10/2010 | Hasenzahl et al. |
| 7,976,719 B2 | 7/2011 | Batz-Sohn et al. |
| 8,012,367 B2 | 9/2011 | Hasenzahl et al. |
| 8,039,110 B2 | 10/2011 | Jenkner et al. |
| 2002/0090316 A1 | 7/2002 | Standke et al. |
| 2002/0098243 A1 | 7/2002 | Edelmann et al. |
| 2002/0127415 A1 | 9/2002 | Standke et al. |
| 2002/0197311 A1 | 12/2002 | Hasenzahl et al. |
| 2003/0018155 A1 | 1/2003 | Krafczyk et al. |
| 2003/0101898 A1 | 6/2003 | Standke et al. |
| 2003/0108580 A1 | 6/2003 | Hasenzahl et al. |
| 2003/0134969 A1 | 7/2003 | Schlosser et al. |
| 2003/0203117 A1 | 10/2003 | Bartkowiak et al. |
| 2003/0228271 A1 | 12/2003 | Batz-Sohn et al. |
| 2004/0103814 A1 | 6/2004 | Shin et al. |
| 2004/0240062 A1 | 12/2004 | Lortz et al. |
| 2005/0169861 A1 | 8/2005 | Lortz et al. |
| 2005/0265934 A1 | 12/2005 | Schumacher et al. |
| 2006/0063002 A1 | 3/2006 | Edelmann et al. |
| 2006/0104881 A1 | 5/2006 | Lortz et al. |
| 2006/0159635 A1 | 7/2006 | Meyer et al. |
| 2006/0159636 A1 | 7/2006 | Meyer et al. |
| 2006/0159637 A1 | 7/2006 | Meyer et al. |
| 2006/0163533 A1 | 7/2006 | Batz-Sohn et al. |
| 2006/0229210 A1 | 10/2006 | Neugebauer et al. |
| 2006/0292192 A1 | 12/2006 | Hasenzahl et al. |
| 2007/0054056 A1 | 3/2007 | Albert et al. |
| 2007/0099004 A1 | 5/2007 | Edelmann et al. |
| 2007/0110906 A1 | 5/2007 | Edelmann et al. |
| 2007/0110912 A1 | 5/2007 | Standke |
| 2007/0231280 A1 | 10/2007 | Schumacher et al. |
| 2007/0297998 A1 | 12/2007 | Meyer et al. |
| 2008/0003448 A1 | 1/2008 | Standke et al. |
| 2008/0027161 A1 | 1/2008 | Schlosser et al. |
| 2008/0058489 A1 | 3/2008 | Edelmann et al. |
| 2008/0095724 A1 | 4/2008 | Hasenzahl et al. |
| 2008/0187673 A1 | 8/2008 | Standke et al. |
| 2008/0188617 A1 | 8/2008 | Standke et al. |
| 2008/0206572 A1 | 8/2008 | Edelmann et al. |
| 2008/0210130 A1 | 9/2008 | Giessler-Blank et al. |
| 2008/0213325 A1 | 9/2008 | Schumacher et al. |
| 2008/0221318 A1 | 9/2008 | Edelmann et al. |
| 2008/0249237 A1 | 10/2008 | Hager et al. |
| 2008/0264299 A1 | 10/2008 | Lortz et al. |
| 2009/0005518 A1 | 1/2009 | Just et al. |
| 2009/0007818 A1 | 1/2009 | Militz et al. |
| 2009/0011246 A1 | 1/2009 | Giessler-Blank et al. |
| 2009/0022898 A1 | 1/2009 | Standke et al. |
| 2009/0030162 A1 | 1/2009 | Mueh et al. |
| 2009/0047225 A1 | 2/2009 | Hasenzahl et al. |
| 2009/0069464 A1 | 3/2009 | Standke |
| 2009/0131694 A1 | 5/2009 | Schumacher et al. |
| 2009/0186053 A1 | 7/2009 | Meyer et al. |
| 2009/0261309 A1 | 10/2009 | Lortz et al. |
| 2010/0041629 A1 | 2/2010 | Giessler-Blank et al. |
| 2010/0117021 A1 | 5/2010 | Batz-Sohn et al. |
| 2010/0209339 A1 | 8/2010 | Schumacher et al. |
| 2010/0209719 A1 | 8/2010 | Borup et al. |
| 2010/0233392 A1 | 9/2010 | Batz-Sohn et al. |
| 2010/0308287 A1 | 12/2010 | Lortz et al. |
| 2011/0034584 A1 | 2/2011 | Albert et al. |
| 2011/0045723 A1 | 2/2011 | Nowak et al. |
| 2011/0071256 A1 | 3/2011 | Nowak et al. |
| 2011/0143147 A1 | 6/2011 | Edelmann et al. |
| 2011/0259240 A1 | 10/2011 | Jenkner et al. |
| 2011/0268899 A1 | 11/2011 | Albert et al. |
| 2011/0308423 A1 | 12/2011 | Friedel et al. |
| 2012/0031302 A1 | 2/2012 | Albert et al. |
| 2012/0204762 A1 | 8/2012 | Albert et al. |

FOREIGN PATENT DOCUMENTS

| | | |
|---|---|---|
| EP | 0 228 657 | 7/1987 |
| EP | 0 811 584 | 12/1997 |
| EP | 0879842 | 11/1998 |
| EP | 0 916 627 | 5/1999 |
| EP | 0 748 357 | 6/1999 |
| EP | 0 930 342 | 7/1999 |
| EP | 1 202 812 | 5/2002 |
| EP | 1 205 481 | 5/2002 |
| EP | 1 308 428 | 5/2003 |
| FR | 2 870 851 | 12/2005 |
| GB | 1 153 178 | 5/1969 |
| JP | 06 345512 | 12/1994 |

* cited by examiner

Fig. 1: Test bodies for carrying out the corrosion experiments

Fig. 2a:

Corrosion current measurement at the sensors with 10 mm coverage of the bodies P1 and P2.

Fig. 2b:

Corrosion current measurement at the sensors with 10 mm coverage of the bodies P1 and P2.

MIXTURE CONTAINING ORGANOSILICON COMPOUND AND USE THEREOF

The present invention relates to the use of mixtures based on at least one water-soluble organic polymer and an organosilicon compound for protecting substrates from corrosion, mixtures based on at least one water-soluble organic polymer and an organosilicon compound and a process for the preparation of these mixtures.

In chemistry, corrosion designates the chemical reaction of a material with substances from its environment, a measurable change occurring in the material. By rule, the material is a metal. However, the term can also be applied to other materials, such as glass, concrete, mortar and other mineral building materials. There are various types of corrosion, such as, for example, oxygen corrosion, which results in the formation of an oxide layer, such as, for example, rust, hydrogen corrosion, also referred to as acid corrosion, hydrogen embrittlement, glass corrosion, which is understood as meaning the structural change of the surface of drinking glasses and other glass objects and which is recognizable visually by a milky gray haze which can no longer be removed, and bacterial anaerobic corrosion.

For suppressing this phenomenon, there are a number of different corrosion inhibitors proposed in particular for protecting steel in cementitious materials. Some are also pulverulent and can be metered in this form or as a solution.

Thus, for example, EP 1 176 125 A1 describes aromatic sulfonic acid compounds and metal salts thereof for use in concrete and especially in repair mortars.

GB 1 153 178 describes a combination of water-soluble chromate, nitrate or nitrite with a salt of an aromatic or heterocyclic amine as a corrosion inhibitor in concrete materials. Particularly disadvantageous is that, in the case of a high chloride content in the concrete, a comparatively high proportion of nitrite or nitrate has to be introduced in order to be efficient. Moreover, it is not advantageous that the active substance is gradually consumed by a degradation reaction.

Furthermore, JP 6 345 512 describes metal powders, such as Zn, Al, Mg, as a corrosion inhibitor in cement or polymer-modified cement.

Although all these products are suitable as a corrosion inhibitor for protecting steel in cementitious materials, they have no or substantially no influence on the water-repellent properties of such building materials.

In order to meet this requirement, US 20040103814 A1 uses a mixture of water repellent, one or more alkanolamines and optionally corrosion inhibitors, the water repellent having to meet specific requirements. However, these systems are liquid and therefore cannot be metered into a pulverulent dry mortar mix. Moreover, both water repellent and corrosion inhibitors must be metered in order to perform both functions in the mortar.

Silanes and siloxanes as water repellents have been known for decades. These are as a rule obtainable only in liquid form and are applied as a treatment composition to the cured concrete. Since such compositions are generally applied by spray methods, frequently a plurality of application steps is also required in order to achieve the product consumption strived for, i.e. the desired degree of application. This is not only time-consuming but there is also considerable dependency on the weather conditions. Thus, for example, there should be no rain or strong wind. In order to be able to apply relatively large amounts, so-called "creams" were developed. However, these generally lead to poor penetration behavior of the active substance into the substrate, which has a negative effect, particularly in the case of highly dense substrates, such as concrete.

In addition, discoloration or at least an undesired shine or an oily appearance of the substrate surface may occur in the case of active substances having a relatively high degree of oligomerization, this being caused by the fact that higher oligomers do not penetrate into the substrate.

Moreover, frost thawing salts or chloride-containing maritime environments in concrete protection require, especially for reinforced concrete and for steel reinforcements, more than just one water repellent treatment since corroded metals in structures have a decisive adverse effect on the load-bearing capacity of structures.

EP 1 205 481 A2 discloses mixtures of n-propylethoxysiloxanes and emulsions thereof for impregnating mineral substrate surfaces. These mixtures are applied in liquid form to the hardened surfaces, further applications often being necessary or at least being useful.

EP 1 308 428 A2 describes the use of liquid silanes or silane formulations as a corrosion inhibitor, these substantially being applied to the surface of the hardened substrate. Silanes and silane formulations in powder form are not described.

EP 0 913 370 A1 discloses a process for the production of a homogeneous hydrophobized concrete, also referred to as mass hydrophobization, the uptake of NaCl solutions also being substantially reduced thereby. An aqueous emulsion which contains hydrolyzable organosilicon compounds and contains at least one alkoxysilane and, if desired, an organosilicon compound acting as a surfactant is added for this purpose. These systems are liquid and cannot be readily converted into powder form, which complicates their storage and transport, in particular at temperatures below the freezing point. Moreover, it is not possible to produce dry mortar and/or pulverulent compounds containing said systems for concrete production.

EP 0 228 657 A2 teaches, inter alia, the use of water-redispersible or water-soluble, anhydrous powders which are based on at least one organic silicon compound, as additives to renders, hydraulic binders, loam or paints, dissolved in water, for hydrophobization of bulk materials or as binders for finely divided inorganic or organic substances. The use of these powders for hydrophobization of cementitious systems and/or for protection of the systems from corrosion, in particular of metal which is surrounded by mineral building materials, is not mentioned. Moreover, these powders cannot be produced without problems, which further complicates their production, storage and use.

EP 0 811 584 A1 mentions cementitious materials in powder form, containing a granulated water-repellent additive which contains from 5 to 15% by weight of an organopolysiloxane component, from 10 to 40% by weight of a water-soluble or water-dispersible binder and from 50 to 80% by weight of a carrier particle. The cementitious material results in water repellency. It is not mentioned that these products can be used for protection from corrosion. Another disadvantage is that the organopolysiloxane mainly responsible for the water repellency is present only in very small amounts in the additive. Accordingly, a relatively large amount therefore has to be used, which in turn can lead to disadvantageous effects by the other components, such as the binder and the carrier particles.

Unfortunately, all these measures are not sufficient for the treatment and preservation of structures and therefore do not meet the high requirements. In particular, the surface treatment or the hydrophobization of building blocks or structures with compositions and measures known to date is not sufficiently effective for reducing the corrosion of the materials, in particular of steel reinforcements. It is well known that, in addition to stress cracks, initially in particular as a result of environmental and weathering influences, the building substance becomes cracked or brittle, with the result that substances penetrating into the structure lead to further damage to the structures.

It was therefore the object to provide a material for protecting materials from corrosion, which material can be added in particular in powder form to dry formulations, but can also be used as a liquid formulation. It is important that the powder can be easily produced and is stable during storage. When added to a dry formulation, this should be readily wettable and the material should disperse, redisperse or dissolve readily in order to ensure rapid and optimum distribution. It is important that the material can display its effect fully in the matrix stirred with water. Moreover, it should not have any toxic properties and should exhibit no interaction or only very little interaction with the hydraulically setting component, so that, for example, no retardation of setting of the mineral-setting component occurs.

This complex object could surprisingly be achieved by the use of a water-dispersible, -redispersible or -soluble mixture (also designated below as powder for short), based on at least one water-soluble organic polymer and at least one organosilicon compound, or of a composition containing at least one water-soluble organic polymer, at least one organosilicon compound and water for protecting substrates from corrosion. Thus, the object was advantageously achieved according to the invention according to the information in the patent claims.

The present invention therefore relates to the use of at least one water-dispersible, -redispersible or -soluble mixture based on at least (i) at least one water-soluble organic polymer and
(ii) at least one organosilicon compound for protecting substrates from corrosion, the organosilicon compound being selected from the group consisting of the organofunctional silanes, polysilanes, silane esters, siloxanes, silicones and/or silicic acid esters.

Mixtures according to the invention or mixtures used according to the invention are preferably based on at least one component (i) from the series consisting of polyvinyl acetate, polyvinyl alcohol, polyvinylpyrrolidones, starches, starch derivatives, polyacrylates, polymethacrylates, polymaleates, water-soluble cellulose ethers, water-soluble polyethylene oxides, water-soluble proteins—to mention but a few examples. However, it is also possible to use other water-soluble polymers as component (i). Here and below, the respective disclosure for component (i) of the present application is also to be ascribed to component (iii), and vice versa.

An extremely large number of organosilicon compounds can be used as component (ii), "organofunctional" being equivalent to "organo" in the context of the present invention, which means that the silicon compound has at least one substituent having at least one carbon atom. Preferred organosilicon compounds are selected from the group consisting of the organofunctional silanes, polysilanes, silane esters, siloxanes, silicones and/or silicic acid esters. In particular, said organosilicon compounds may be used as individual components, as mixtures of at least two organofunctional silanes, as mixtures of at least two organofunctional siloxanes or as mixtures of, for example, at least one organofunctional silane and at least one organofunctional siloxane. Here and below, the respective disclosure for component (ii) of the present application is also to be ascribed to components (iv), and vice versa.

It is often advantageous, but not essential, if said organosilicon compound is present in liquid form and the boiling point at atmospheric pressure of the organosilicon compound used is not too low, preferably about 100° C. or more. They may be soluble in water, insoluble or only partly soluble. Often, preferred compounds are those which have no water solubility or only limited water solubility, for example silicic acid esters having the formula $Si(OR')_4$, polysilanes of the formula $R_3Si(SiR_2)_nSiR_3$ where R is n=0 to 500, n=0 to 8 being preferred, di-, oligo- and polysiloxanes or their mixtures of the general formula or empirical formula $R_cH_dSi(OR')_e(OH)_fO_{(4-c-d-e-f)/2}$ where c=0 to 3, d=0 to 2, e=0 to 3, f=0 to 3 and the sum c+d+e+f is at most 3.5, R' in each case independently being an alkyl or alkoxyalkylene radical having 1 to 4 C atoms and preferably being methyl or ethyl, groups R being identical or different and being branched or straight-chain alkyl radicals having 1 to 22 C atoms, cycloalkyl radicals having 3 to 10 C atoms, alkylene radicals having 2 to 4 C atoms, aryl, aralkyl or alkylaryl radicals having 6 to 18 C atoms, it being possible for said radicals R also to be substituted by halogens, such as F or Cl, by ether, thioether, ester, amide, nitrile, hydroxyl, amine, carboxyl, sulfonic acid, epoxide, carboxylic anhydride and carbonyl groups, it also being possible for R to have the meaning OR' in the case of the polysilanes.

Preferred organosilicon compounds according to (ii) are in particular mixtures of alkylalkoxysiloxanes of the empirical formula $(R'')Si(OR''')_xO_y$ where 0<x<2 and 0.5<y<1.5, preferably 1.0<x<2.0 and 0.5<y≦1.0, with the proviso that (2y+x)=3, and groups R'' are identical or different and R'' is a linear, branched or cyclic alkyl group having 1 to 18 C atoms, furthermore groups R''' are identical or different and R''' is a hydrogen or a linear or branched alkyl group having 1 to 4 C atoms, preferably H, methyl, ethyl, propyl.

Furthermore, tetraalkoxysilanes, alkyltrialkoxysilanes, dialkyldialkoxysilanes are preferred as organosilicon compounds according to (ii), it being possible for linear and/or branched $C_1$- to $C_{20}$-alkyl groups to be present as alkyl groups and linear and/or branched $C_1$- to $C_{10}$-alkoxy groups to be present as alkoxy groups, methoxy, ethoxy and/or isopropoxy groups preferably being used as the latter. Moreover, a copolymerizable alkylene group, such as, for example, a vinyl, allyl and/or (meth)acryloyl group, may also be used instead of an alkyl group.

Nonlimiting examples of preferred organosilicon compounds in the context of the present invention are organofunctional silanes or siloxanes from the series consisting of the alkoxysilanes, such as hydrogentrimethoxysilane, hydrogentriethoxysilane, tetramethoxysilane, tetraethoxysilane, the alkylsilanes, such as methyltrimethoxysilane, methyltriethoxysilane, methyltripropoxysilane, ethyltrimethoxysilane, ethyltriethoxysilane, n-propyltrimethoxysilane and isopropyltrimethoxysilane, n-propyltriethoxysilane and isopropyltriethoxysilane, n-butyltrimethoxysilane and isobutyltrimethoxysilane, n-butyltriethoxysilane and isobutyltriethoxysilane, n-pentyltrimethoxysilane and isopentyltrimethoxysilane, n-pentyltriethoxysilane and isopentyltriethoxysilane, n-hexyltrimethoxysilane and iso-hexyltrimethoxysilane, n-octyltrimethoxysilane and isooctyltrimethoxysilane, n-octyltriethoxysilane and isooctyltriethoxysilane, hexadecyltrimethoxysilane, hexadecyltriethoxysilane, octadecyltrimethoxysilane, octadecyltriethoxysilane, dimethyldimethoxysilane, dimethyldiethoxysilane, n-butylmethyldimethoxysilane and isobutylmethyldimethoxysilane, n-butylmethyldiethoxysilane and isobutylmethyldiethoxysilane, cyclohexylmethyldimethoxysilane, diisopropyldimethoxysilane, diisobutyldimethoxysilane and isobutylisopropyldimethoxysilane, the vinylsilanes, such as vinyltrimethoxysilane, vinyltriethoxysilane, vinylmethyldialkoxysilane and vinyltris(2-methoxyethoxysilane), the aminoalkoxysilanes, such as 1-aminomethyltrimethoxysilane, 1-aminomethyltriethoxysilane, 2-aminoethyltrimethoxysilane, 2-aminoethyltriethoxysilane, 3-aminopropyltrimethoxysilane, 3-aminopropyltriethoxysilane, 3-aminoisobutyltrimethoxysilane, 3-aminoisobutyltriethoxysilane, N-(n-butyl)-3-aminopropyltrimethoxysilane, 3-aminopropylmethyldiethoxysilane, 3-ureidopropyltrimethoxysilane, 3-ureidopropyltriethoxysilane, N-aminoethyl-3-aminopropyltrimethoxysilane, N-aminoethyl-3-aminopropyltriethoxysilane, triamino-functional propyltrimethoxysilane and 3-(4,5-dihydroimidazolyl)propyltriethoxysilane, the glycidyl ether- or glycidylalkyl-functional alkoxysilanes, such as 3-glycidyloxypropyltrimethoxysilane and 3-glycidyloxypropyltriethoxysilane, the chloro- and fluoroalkyl-functional alkoxysilanes, such as tridecafluorooctyltriethoxysilane and tridecafluorooctyltrimethoxysilane, 3-chloropropyltriethoxysilane, the acryloyl or methacryloyl-functional alkoxysilanes, such as acryloyloxypropyltrimethoxysilane, acryloyloxypropyltriethoxysilane, 3-methacryloyloxypropyltrimethoxysilane, 3-methacryloyloxypropyltriethoxysilane, 3-methacryloyloxyisobutyltrimethoxysilane, 3-methacryloyloxyisobutyltriethoxysilane, 3-methacryloyloxy-2-methylpropyltrimethoxysilane and 3-methacryloyloxy-2-methylpropyltriethoxysilane, the mercapto-functional alkoxysilanes, such as 3-mercaptopropyltrimethoxysilane and 3-mercaptopropyltriethoxysilane, the sulfane or polysulfane-functional alkoxysilanes, such as bis(triethoxysilylpropyl)tetrasulfane, bis(trimethoxysilylpropyl)tetrasulfane, bis(triethoxysilylpropyl)disulfane, bis(trimethoxysilylpropyl)disulfane, bis(triethoxysilylpropyl)sulfane, bis(trimethoxysilylpropyl)sulfane, bis(triethoxysilylpropyl)pentasulfane and bis(trimethoxysilylpropyl)pentasulfane, it being possible for corresponding oligomers produced by hydrolysis to be present in a concentration from 0.001 to 5%, based on the composition, in the abovementioned monomeric organosilanes, further organosilicon compounds, such as beta-nitriloethyltriethoxysilane, arylsilanes, in particular phenyltriethoxysilane, but also dipropyldiethoxysilane, triphenylsilanol and preferably liquid condensates thereof, silanes containing quaternary ammonium salt groups, in particular of amino-functional silanes or siloxanes, carboxyl- and carboxylic anhydride-functional silanes, disilanes, such as dimethyltetraalkoxydisilane, tetramethyldialkoxydisilane, trimethyltrialkoxydisilane or the (co)condensates thereof obtainable in general from the corresponding chlorine compounds. Methylhydrogenpolysiloxanes endcapped by trimethylsilyloxy groups, copolymers endcapped by trimethylsilyloxy groups and comprising dimethylsiloxane units and methylhydrogensiloxane units, and dimethylpolysiloxanes having one Si-bonded hydroxyl group each in the terminal units, and the organofunctional siloxanes, such as vinyl-functional siloxanes, alkyl-functional siloxanes, vinyl-/alkyl-functional siloxanes (cocondensates), methacryloyl-functional siloxanes, amino-functional siloxanes, aminoalkyl-/alkyl-functional siloxanes, aminoalkyl-/fluoroalkyl-functional siloxanes or corresponding cocondensates and condensates as described, for example, but not exclusively, in EP 0 590 270 A, EP 0 716 127 A, EP 0 716 128 A, EP 0 748 357 A, EP 0 760 372 A, EP 0 814 110 A, EP 0 879 842 A, EP 0 846 715, EP 0 930 342 A, EP 1 101 787 A, EP 1 205 481 A, EP 1 304 345 A, WO 06/081891, WO 06/081892, WO 06/010666, DE 196 49 953 A, DE 196 49 955 A, DE 197 25 516 A, DE 198 18 923 A, DE 198 23 390 A, DE 198 34 990 A, DE 198 49 308 A, DE 199 04 132 A, DE 199 08 636 A and DE 100 56 344 A, or oligomeric silicic acid esters, for example Dynasylan® 40 and those from DE 27 44 726 C and DE 28 09 871 C, including hydrogencyclosiloxanes, for example so-called $D_nH$ compounds having a degree of oligomerization of n=2 to 20, in particular of n=4 to 6.

The preparation of said organosilicon compounds can, however, also be effected by processes as described in Noll, Chemie and Technologie der Silicone [Chemistry and Technology of the Silicones], 2nd edition 1968, Weinheim, and Houben-Weyl, Methoden der organischen Chemie [Methods of Organic Chemistry], Volume E 20, page 1782 et seq., 2219 et seq., Georg Thieme Verlag, Stuttgart, 1987.

According to the invention, a present mixture can be added in a simple and economical manner during the production of mineral building materials. In particular, present mixtures or powders can advantageously be introduced or admixed during the preparation of building materials from the initial components or additives or ready-to-use building material mixtures on site, i.e. directly at the place of subsequent processing of the building material, or during the production of ready-to-use, pulverulent building material mixtures, for example concrete, render or mortar mixes, or during the preparation of ready-to-use, pulverulent additives for building materials, for example cement, lime, sand or rheology auxiliaries.

The use according to the invention of the present mixtures protects substrates, in particular metal, and/or natural and/or synthetically produced mineral building materials from corrosion. Preferred metals are iron and iron alloys, in particular steel, and aluminum and aluminum alloys. The metal is as a rule surrounded by mineral building materials, for example steel reinforcements in concrete. Preferred building materials are mortar, concrete, renders, grouts, brick material, masonry blocks, building blocks, components and/or natural stone, such as lime-sand brick.

Mixtures according to the invention are preferably used in and/or on mineral building materials which are in contact with metal or surround or enclose metal. Very particular preference is given to mineral building materials, such as concrete, in particular reinforced concrete, cellular concrete, gas concrete, foamed concrete, prefabricated concrete components, mortar, renders, grouts, components comprising lime-sand brick, clinker, brick, porous tiles and clay wall tiles, terracotta, natural stones, fiber cements, screeds, clay articles, masonry, facades, roofs and structures, such as bridges, harbors, residential buildings, industrial buildings and buildings used by the public, such as multistory car parks, railway stations or schools, but also prefabricated parts, such as railway sleepers or L-shaped stones.

The mineral building materials to be produced synthetically contain as a rule a mineral binder which is at least a) a hydraulically setting binder, in particular cement, b) a latently hydraulic binder, in particular acidic blast-furnace slag, pozzolana and/or metakaolin, and/or c) a nonhydraulic binder which reacts under the influence of air and water, in particular calcium hydroxide and/or calcium oxide.

Cement, in particular Portland cement, for example according to EN 196 CEM I, II, III, IV and V, calcium sulfate in the form of alpha- and/or beta-hemihydrate and/or anhydrite and/or high-alumina cement is preferred as the hydraulically setting cement. Pozzolana, such as metakaolin, calcium metasilicate and/or volcanic slag, volcanic tuff, trass, fly ash, blast-furnace slag and/or silica dust, which react hydraulically together with a calcium source, such as calcium hydroxide and/or cement, can be used as the latent hydraulic binder. In particular, lime, generally in the form of calcium hydroxide and/or calcium oxide, can be used as the nonhydraulic binder which reacts under the influence of air and water. In particular, pure Portland cement-based systems or a mixture of Portland cement, high-alumina cement and calcium sulfate are preferred, it being possible, if desired, also to add latent hydraulic and/or nonhydraulic binders in the case of both systems.

Often, binders or binder combinations which produce a high pH together with water are preferred. This results in an oxidized passive layer on the surface of a metal when in contact with said metal, to which passive layer the organosilicon compound can bind.

The mineral binders are typically mixed with aggregates which are sometimes also referred to as fillers. Typical aggregates are quartzitic and/or carbonatic sands and/or flours, for example, quartz sand and/or limestone flour, carbonates, silicates, chalk, phyllosilicates and/or precipitated silicas. Furthermore, light fillers, such as, for example, hollow microspheres comprising glass, polymers, such as polystyrene spheres, aluminosilicates, silicon oxide, aluminum silicon oxide, calcium silicate hydrate, aluminum silicate, magnesium silicate, aluminum silicate hydrate, calcium aluminum silicate, calcium silicate hydrate, silicon dioxide and/or aluminum iron magnesium silicate, but also clays, such as bentonite, can be used, it also being possible for the fillers and/or light fillers to have a natural or artificially produced color.

If water-repellent silane products are used as the organosilicon compound, the corrosion properties of building materials and structures treated in this manner and having corresponding steel or metal reinforcements can also be further substantially improved by the hydrophobization effect achieved—even compared with corrosion protection measures customary on the market.

Surprisingly, it was also found that, in addition to the use according to the invention as a corrosion inhibitor, the mixture can also be used for the consolidation of stones, hydrophobic properties and effects remaining unaffected.

It is surprising in particular that, in addition to a hydrophobizing and/or stone-consolidating effect of compositions which contain organofunctional silanes and/or organofunctional siloxanes, at the same time a corrosion-inhibiting effect, in particular of metal corrosion or corrosion in the case of concrete which comes into contact with water and salts, can advantageously be achieved by the use of abovementioned powders in repair materials or in materials for the production of building blocks, components or structures. Thus, the use according to the invention advantageously also includes the simultaneous avoidance of metal and stone corrosion.

In addition, good and in particular uniform stone-consolidating properties are found in the subsequent structure on application of a powder according to the invention in such materials. Moreover, hydrophobic properties and effects remain unaffected.

Furthermore, it is advantageous if a powder designated in more detail above or mixtures are used according to the invention for the production of mineral materials for repair purposes in the building sector. A corrosion process can also be substantially alleviated by such an application, at least over the course of time.

A corrosion protection effect according to the invention is achieved if the corrosion rate is reduced by more than about 50%, preferably by more than about 80%, in particular by more than about 90%, in comparison with unprotected materials. The corrosion rate is determined, for example in the case of steel reinforcement, by the observed corrosion currents relative to corresponding unprotected concrete.

The amounts of a mixture according to the invention which are used in concrete, based on the solids content of the mixture and the proportion of cement in the concrete, may be up to about 5% by weight or more, it being necessary to ensure that any standard specifications are complied with. The amounts used are preferably set so that a corrosion protection which is optimum for the use according to the invention is obtained. Thus, a high active substance content of organosilicon compound can be used without substantially influencing the other concrete properties, it also being possible to comply with the building guidelines without problems.

The amounts of a mixture according to the invention which are used in mortars, based on the solids content of the mixture and the dry matter of the mortar, is from about 0.01 to about 10% by weight, it being also possible to use larger amounts for special applications. Preferably from about 0.05 to about 5% by weight, in particular from about 0.1 to 3% by weight, of the mixture are used.

The mixtures according to the invention which have a surprisingly good action as corrosion inhibitors are typically incorporated into hydraulically setting materials, the mixtures being added as a rule together with the other components during the production of the mineral building materials.

Mixtures according to the invention are as a rule present in powder form. Thus, they can be processed into corresponding dry mortars, dry renders and/or dry premixes for concrete, such as, for example, cement, in particular modified cements. This permits particularly good metering and very uniform distribution of the mixture in the subsequent building material, and therefore also in the subsequently produced building blocks, components and the structure obtained thereby. These dry mixtures can then easily be mixed on site with addition of a defined amount of water and can subsequently be processed.

However, a mixture according to the invention can also be admixed as a separate component in the preparation of the building material. In this embodiment, it is often advantageous if the building material components are mixed or kneaded with the required amount of water, the mixture being added directly before, during and/or after the addition of water. However, the mixture can also first be added to the mixing water and introduced in this manner into the dry or already moist material in the mixer.

Said mixtures can, however, also be applied superficially in dissolved, preferably low-viscosity to high-viscosity form, i.e. pasty form, to the building materials obtained, as a surface protection, for example by spraying, spreading, rolling or blade-coating. The present composition or formulation can be applied in an amount of more than 50 g/m$^2$, preferably more than 100 g/m$^2$, particularly preferably more than 200 g/m$^2$, to the substrate surface. If desired, multiple application with a drying time of, for example, from 2 hours to about 2 days between the operations may be appropriate, in particular if the desired amount of active substance cannot be applied in one operation because the substrate has only little absorptivity. If said mixture is used as a powder, it is advantageous for this application if the powder is dispersed, redispersed or dissolved beforehand in water; however, other liquids evaporating at ambient temperature can also be used for this purpose.

The present invention also relates to a water-dispersible, -redispersible or -soluble mixture based on
(iii) at least one water-soluble organic polymer and
(iv) at least one organosilicon compound having at least one Si—O—Si and/or having at least one Si—Si bond,
the content of organic polymer (iii), based on the sum of the organic polymer (iii) and of the organosilicon compound (iv), being from about 40 to about 80% by weight, preferably from 40 to about 70% by weight, in particular from 45 to 60% by weight, an organosilicon compound having at least one Si—O—Si bond being based on an oligomer mixture of alkylalkoxysiloxanes, the oligomer mixture containing from 50 to 100% by weight of alkylalkoxysiloxanes and these substantially having a degree of oligomerization of from 2 to 20, and an organosilicon compound having at least one Si—Si bond being a polysilane.

The organic polymers according to component (i), already disclosed above, can advantageously be used as organic polymers of component (iii) or advantageously form the basis of said organic polymers.

As the organosilicon compound according to (iv) having at least one Si—O—Si bond, one according to the above-disclosed component (ii) can likewise advantageously be used or employed, in particular organosiloxanes, such as alkylalkoxysiloxanes or alkylalkoxysiloxane mixtures and/or oligomeric silicic acid esters. Furthermore, or one or more polysilanes are used or employed as the organosilicon compound according to (iv) having at least one Si—Si bond. It is also possible to use a mixture of different organosilicon compounds.

As said organosilicon compound, it is advantageously possible to use one of the above-disclosed components (ii) or (iv), in particular organosiloxanes, such as alkylalkoxysiloxanes or alkylalkoxysiloxane mixtures, or to use said components as starting material in the preparation of mixtures of powders according to the invention.

Thus, it will as a rule be preferred for the mixtures according to the invention and the mixture for the use according to the invention if the organosilicon compound is a liquid at room temperature and atmospheric pressure. Particularly for powders according to the invention, it is advantageous if the boiling point of the organosilicon compound at atmospheric pressure is about 100° C. or higher, preferably about 125° C. or higher, in particular about 150° C. or higher.

If the organosilicon compound is a liquid at room temperature and atmospheric pressure, the viscosity may be very low, but also very high, depending on the compound. However, for the mixtures and use according to the invention, it is often advantageous if low-viscosity organosilicon compounds are used. Preferably, they have a viscosity of from about 1 to 1000 mPa·s, in particular preferably from about 2 to 200 mPa·s, in particular from about 3 to 50 mPa·s and very particularly preferably from about 3 to about 20 mPa·s. The viscosity measurement is generally effected according to DIN 53 015.

Oligomeric silanes or organosiloxanes, such as alkylalkoxysiloxanes, are as a rule characterized via their degree of oligomerization and by their structure. This is explained in more detail below for n-propylethoxysiloxanes and their mixtures by way of example. These organosilicon compounds can be represented approximately by the following general structural formulae:

for linear n-propylethoxysiloxanes and for cyclic n-propylethoxysiloxanes,
n indicating the degree of oligomerization. In other words, the degree of oligomerization reflects the number of Si units per molecule. For determining the degree of oligomerization, gel permeation chromatography (GPC method) and the $^{29}$Si-NMR method were used for the present work. Where an oligomer mixture comprising, for example, 100% by weight, based on well defined oligomers, is stated here, this data is based on the present day limit of detection (about 1%) of corresponding oligomers by said methods. Moreover, oligomers having branched structures may also be present but are more difficult to form.

In order to be able to describe said siloxanes in more detail, reference is additionally made to so-called M-, D- and T-structures in the present application. For the nomenclature regarding the naming of siloxane structures such as these, reference may be made to "Römpp Chemielexikon [Römpp Chemistry Lexicon]"—keyword: Silicone [Silicones].

Furthermore, an oligomer mixture of organosiloxanes of component (ii) or (iv), in particular alkylalkoxysiloxanes, can also be reproduced as empirical formula I $$(R'')Si(OR''')_xO_y \qquad (I),$$

groups R'' here preferably being identical or different and R'' being a linear, branched or cyclic alkyl group having 1 to 18 C atoms, preferably methyl, ethyl, propyl, hexyl, octyl, hexadecyl, in particular n-propyl, groups R''' being identical or different and R''' being a hydrogen or a linear or branched alkyl group having 1 to 4 C atoms, preferably methyl, propyl, butyl, in particular ethyl, and $1.0<x<2.0$ and $0.5<y\leq1.0$, with the proviso that $(2y+x)=3$.

Particularly preferably, an n-propylethoxysiloxane mixture, for example Protectosil® 266, is used in the present invention according to component (ii) or (iv).

It may also be advantageous if an oligomer mixture used according to the invention contains substantially from 70 to 100% by weight, preferably from about 80 to 99% by weight, in particular from about 90 to 98% by weight, of alkylalkoxysiloxanes having a degree of oligomerization of from 2 to 20, particularly preferably from 2 to 10, and in particular from 3 to 6. Such oligomer mixtures can, however, also contain corresponding monomeric alkylalkoxysilanes.

Said oligomer mixtures of component (ii) or (iv) may, in particular, contain the following proportions of alkylalkoxysiloxanes, in particular n-propylethoxysiloxanes, the data in each case being supplemented to 100% by weight by further components, in particular other alkylalkoxysiloxanes, but, if desired, also residual amounts of water and/or alcohol up to $\leq5\%$ by weight, preferably $\leq2\%$ by weight, in particular $\leq1\%$ by weight down to the limit of detection:

from 0 to 30% by weight, particularly preferably less than 10% by weight, very particularly preferably from 0.001 to less than 5% by weight, in particular from 0.01 to less than 1% by weight, of alkylalkoxysiloxanes having a degree of oligomerization of n equal to 2, which have an $M_2$ structure, from 8 to 40% by weight, particularly preferably from 10 to 35% by weight, very particularly preferably from 15 to 30% by weight, of alkylalkoxysiloxanes which have an $M_2D$- and/or $D_3$-structure, said structures each corresponding to a molar mass of an alkylalkoxysiloxane having the degree of oligomerization of n equal to 3, from 20 to 60% by weight, particularly preferably from 25 to 55% by weight, very particularly preferably from 35 to 50% by weight, in particular from 30 to 45% by weight, of alkylalkoxysiloxanes which have an $M_2D_2$ and/or $M_3T$ and/or $D_4$ structure, said structures each corresponding to a molar mass of an alkylalkoxysiloxane having the degree of oligomerization of n equal to 4, from 5 to 35% by weight, particularly preferably from 8 to 30% by weight, very particularly preferably from 15 to 25% by weight, in particular from 10 to 24% by weight, of alkylalkoxysiloxanes which have an $M_2D_3$ and/or $M_3DT$ and/or $D_5$ structure, with said structures each corresponding to a molar mass of an alkylalkoxysiloxane having the degree of oligomerization of n equal to 5, from 0.1 to 30% by weight, particularly preferably from 0.5 to 25% by weight, very particularly preferably from 5 to 20% by weight, of alkylalkoxysiloxanes which have an $M_2D_4$ and/or $M_3D_2T$ and/or $M_4T_2$ and/or $D_6$ structure, said structures each corresponding to a molar mass of an alkylalkoxysiloxane having a degree of oligomerization of n equal to 6.

A mixture containing an oligomer mixture of alkylalkoxysiloxanes in the context of components (ii) and (iv) of the present invention can be prepared for example—but not exclusively—according to the teaching of EP 1 205 481 A2. In addition, a composition mentioned there, including the additives mentioned there, may be used in the present invention. The disclosure content of EP 1 205 481 A2 is hereby incorporated in its entirety in the present description.

An oligomer mixture of alkylalkoxysiloxanes, such as Protectosil® 266, which is used according to the invention or employed for the preparation of the powders can for example—but not exclusively—have the following physical chemical properties and following oligomer distributions:

| flashpoint | (EN 22719) | >70° C. |
|---|---|---|
| viscosity | (20° C., DIN 53015) | 35 mPa·s |
| density | (20° C., DIN 51757) | 1.04 g/cm³ |
| water content | | ≤0.05% |
| free alcohol | | ≤0.3% |

| Degree of oligomerization (structure types) | Proportion in % by weight |
|---|---|
| 3 ($M_2D$, $D_3$) | 25 |
| 4 ($M_2D_2$, $M_3T$, $D_4$) | 33 |
| 5 ($M_2D_3$, $M_3DT$, $D_5$) | 14 |
| 6 ($M_2D_4$, $M_3D_2T$, $M_4T_2$, $D_6$) | 23 |

Likewise, a said oligomer mixture of alkylalkoxysiloxanes of component (ii) or (iv) may contain less than 10% by weight, preferably from 0 to 8% by weight, particularly preferably from 0.001 to less than 5% by weight, of alkylalkoxysiloxanes having a higher degree of oligomerization than 6, the stated amounts being based on the oligomer mixture.

Furthermore, an oligomer mixture in the sense of the component (ii), (iv) or (vi) may contain from 0 to less than 5% by weight of alkylalkoxysiloxanes which have a degree of oligomerization of n equal to from 7 to 20, the stated amounts being based on the oligomer mixture.

It is also suitable if a said oligomer mixture of alkylalkoxysiloxanes according to component (ii) or (iv) contains from 0 to less than 1% by weight of alkylalkoxysiloxanes, these having a higher degree of oligomerization than n equal to 20.

Alkylalkoxysiloxane oligomer mixtures used according to the invention as component (ii) or (iv) contain, however, substantially those alkylalkoxysiloxanes having a degree of oligomerization of n equal to 2 to 6, particularly preferably only those having n equal to 3 to 6.

In general, it is advantageous if mixtures according to the invention have a low proportion of volatile organic compounds (VOC), such compounds including those which have a boiling point at atmospheric pressure of not more than 250° C. The VOC content is, based on the solids content, preferably less than 2% by weight, particularly preferably less than 0.5% by weight and in particular less than 0.2% by weight.

However, it is possible for a mixture also to contain small amounts of free alcohol in addition to an oligomer mixture of alkylalkoxysiloxanes. Such a proportion of free alcohol in the powder can be gradually formed, for example, in the presence of comparatively high atmospheric humidity by hydrolysis of alkoxy groups. The proportions are from 0 to less than 5% by weight, preferably less than 2% by weight, very particularly preferably less than 1% by weight, of free alcohol, based on the amount of organosilicon compound in the powder.

For the mixtures according to the invention and the mixture for the use according to the invention, it is preferable if the organosilicon compound is not water soluble or has only limited water solubility or is an aqueous dispersion or a water-dispersible or -re-dispersible powder. If a readily water-soluble organosilicon compound is used, it is preferably a water-soluble powder. In addition, the mixture, independently of the water solubility of the organosilicon compound, may be a granulated powder in which the water-soluble organic polymer and the organosilicon compound is absorbed and/or adsorbed onto an inorganic matrix, it being necessary to ensure in the choice of the inorganic matrix that the absorbed and/or adsorbed compounds easily become detached from the matrix during the use according to the invention in order to display the effect.

It is useful if the water-soluble organic polymer forms a stable dispersion with the organosilicon compound, if this is water-insoluble or has only limited water solubility, in aqueous solution it is often advantageous if the compounds are tailored to one another so that the dispersion obtained has the same physical properties, such as, for example, pH, viscosity, particle size and color, even after 24 hours and if no separation, i.e. a settling of dispersion particles, occurs. Since, depending on the type of organosilicon compound, different water-soluble organic polymers give the desired dispersion stability, a water-soluble organic polymer may be ideal for a certain organosilicon compound, whereas incompatibility can occur with other organosilicon compounds. The water-soluble organic polymer must therefore be tailored to the organosilicon compound. Stabilization systems which make it possible in a simple manner to convert the aqueous dispersion composition obtained, by means of drying, into powders which are redispersible in water are therefore preferred.

Typically suitable water-soluble organic polymers, unless dissolved, are solids at room temperature and preferably relatively high molecular weight compounds. These include natural compounds, such as polysaccharides, which, if desired, are chemically modified, synthetic relatively high molecular weight oligomers and polymers which do not have an ionic character or have only a weakly ionic character, and/or polymers which are prepared in situ by means of monomers which at least partially have ionic character, for example by means of free radical polymerization in an aqueous medium. It is also possible to use only one water-soluble organic polymer or to combine different polymers with one another. However, it is often useful if the water-soluble organic polymer has no carboxyl groups or only a small proportion of carboxyl groups.

Polysaccharides which can preferably be used and derivatives thereof are polysaccharides and polysaccharide ethers which are soluble in cold water, such as cellulose ethers, starch ethers (amylose and/or amylopectin and/or derivatives thereof), guar ethers and/or dextrins. It is also possible to use synthetic polysaccharides, such as anionic, nonionic or cationic heteropolysaccharides, in particular xanthan gum or wellan gum. The polysaccharides can, but need not, be chemically modified, for example with carboxymethyl, carboxyethyl, hydroxyethyl, hydroxypropyl, methyl, ethyl, propyl, sulfate, phosphate and/or long-chain alkyl groups. Further natural stabilization systems are alginates, peptides and/or proteins, such as, for example, gelatin, casein and/or soybean protein. Dextrins, starch, starch ethers, casein, soybean protein, gelatin, hydroxyalkyl cellulose and/or alkylhydroxyalkyl cellulose are very particularly preferred.

Synthetic prepared water-soluble organic polymers may consist of one or more protective colloids, for example one or more polyvinylpyrrolidones and/or polyvinylacetals having molecular weights of from 2000 to 400 000, polyvinyl alcohols which are completely or partly hydrolyzed and/or modified with amino groups, carboxyl groups and/or alkyl groups and have a degree of hydrolysis of, preferably, from about 70 to 100 mol %, in particular from about 80 to 98 mol %, and a Höppler viscosity, in 4% strength aqueous solution, of preferably from 1 to 50 mPa·s, in particular from about 3 to 40 mPa·s (measured at 20° C. according to DIN 53015), and melamine formaldehyde sulfonates, naphthalene formaldehyde sulfonates, block copolymers of propylene oxide and ethylene oxide, styrene-maleic acid and/or vinyl ether-maleic acid copolymers. Relatively high molecular weight oligomers may be nonionic, anionic, cationic and/or amphoteric emulsifiers, such as, for example, alkanesulfonates, alkylarylsulfonates, alkylsulfates, sulfates of hydroxyalkanols, alkyl and alkylaryl disulfonates, sulfonated fatty acids, sulfates and phosphates of polyethoxylated alkanols and alkylphenols and esters of sulfosuccinic acid, quaternary alkylammonium salts, quaternary alkylphosphonium salts, polyadducts, such as polyalkoxylates, for example adducts of from 5 to 50 mol of ethylene oxide and/or propylene oxide per mole of linear and/or branched $C_6$- to $C_{22}$-alkanols, alkylphenols, higher fatty acids, higher fatty acid amines, primary and/or secondary higher alkylamines, the alkyl group in each case preferably being a linear and/or branched $C_6$- to $C_{22}$-alkyl group. Synthetic stabilization systems, in particular partly hydrolyzed, optionally modified, polyvinyl alcohols, are very particularly preferred, it being possible for one or more polyvinyl alcohols to be used together, if desired with small amounts of suitable emulsifiers. Preferred synthetic stabilization systems are in particular modified and/or unmodified polyvinyl alcohols having a degree of hydrolysis of from 80 to 98 mol % and a Höppler viscosity, as a 4% strength aqueous solution, of from 1 to 50 mPa·s and/or polyvinylpyrrolidone.

It is also possible for a plurality of water-soluble organic polymers to be used in a mixture according to the invention, for example a combination of one or more natural compounds with one or more synthetically prepared compounds.

If an aqueous composition (also referred to as dispersion or emulsion) or formulation according to the invention is used in the context of the present invention, the weight ratio of the organosilicon compound used in each case to the organic polymer may be from about 95:5 to 5:95, in particular from about 85:15 to 15:85 and preferably from about 70:30 to 30:70 and very particularly preferably from about 60:40 to 40:60, the composition or formulation advantageously containing from 5 to 95 parts by weight of water, preferably from 10 to 70 parts by weight, particularly preferably from 15 to 60 parts by weight, very particularly preferably from 20 to 50 parts by weight, in particular from 25 to 40 parts by weight, of water per 100 parts by weight of composition or formulation.

If the water-soluble polymer forms a dispersion with the organosilicon compound, the particle size thereof can be established in a targeted manner by the choice of the polymer, of the weight ratio of polymer to organosilicon compound used and also by the manner of mixing together. If the mixture is dried to give a powder and subsequently dispersed or redispersed, the original particle size is as a rule reestablished. It is often advantageous if the mixture dispersed, dispersible or redispersible in water has a mean particle size of from about 0.1 to about 50 μm, in particular from about 0.2 to about 30 μm, when dispersed or redispersed in water. If the mixture is present in powder form, a mean particle size of from about 20 to about 500 μm, in particular from about 50 to about 250 μm, has proven advantageous. However, they may also be present outside this range, larger particles often being more suitable than smaller ones which tend to form dust.

The determination of the particle size can be carried out by the customary methods of measurement, the light scattering method preferably being used and the particle size being stated as the volume average.

The water-dispersible or -redispersible mixture advantageously has a solids content of from about 5 to 75% by weight, in particular from about 15 to 65% by weight and very particularly preferably from about 30 to 50% by weight when dispersed or redispersed in water and typically has a viscosity of from about 100 to 100 000 mPa·s, preferably from about 200 to 25 000 mPa·s, in particular from about 300 to 10 000 mPa·s and very particularly preferably from about 500 to 5000 mPa·s, measured according to DIN 53 015.

The mixtures according to the invention or mixtures for the use according to the invention may contain yet further additives. There are no limits with respect to the type of further additives. As a rule, they have an important function in the use of the powder according to the invention, which however is not essential. Further water-soluble organic polymers may also be added, the addition thereof preferably being effected in powder form in this case.

The content of the additives, based on the sum of the water-soluble organic polymer and the organosilicon compound, is not subject to any substantial limits. Thus, the content of surface-active substances may be very small and may be of the order of about 0.01% by weight or more, in particular about 0.1% by weight or more and preferably about 1% by weight or more, based on the solids content of the mixture. On the other hand, substantially larger proportions of additives may be mixed with the mixtures according to the invention, such as, for example, fillers or dispersions and/or dispersion powders based on emulsion and/or suspension polymers containing, for example, copolymers based on vinyl acetate, ethylene-vinyl acetate, ethylene-vinyl acetate-vinyl versatate, ethylene-vinyl acetate-(meth)acrylate, ethylene-vinyl acetate-vinyl chloride, vinyl acetate-vinyl versatate, vinyl acetate-vinyl versatate-(meth)acrylate, vinyl versatate-(meth)acrylate, pure (meth)acrylate, styrene-acrylate and/or styrene-butadiene. In this case, up to about 1000 parts, in particular up to about 500 parts and preferably up to about 100 parts of additives can be added per part of the material according to the invention.

Preferred additives are in particular water repellents, such as fatty acids and salts and esters thereof, fatty alcohols, silanes, air-entraining agents, wetting agents, antifoams, emulsifiers, film formation auxiliaries, setting and solidification accelerators, setting retardants, thickeners, dispersants, rheology control additives, such as cement plasticizers, polycarboxylates, polycarboxylate ethers, polyacrylamides and/or thickeners, corrosion inhibitors, such as alkylammonium benzoates, aminoalcohols, gluconic acid and/or the alkali metal and alkaline earth metal salts thereof, water retention agents, cellulose fibers and cellulose ethers, starch ethers, guar ethers, additives for reducing efflorescence, sedimentation and/or floating, fillers and, if the mixture is pulverulent, additives for reducing powder blocking and/or film-forming, water-insoluble dispersion powders and, if the mixture is liquid, film-forming polymer dispersions.

Furthermore, pulverulent and/or liquid antifoams, wetting agents, alkyl-, hydroxyalkyl- and/or alkylhydroxyalkylpolysaccharide ethers, such as cellulose ethers, starch ethers and/or guar ethers, the alkyl and hydroxyalkyl group typically being a $C_1$- to $C_4$-group, synthetic polysaccharides, such as anionic, nonionic or cationic heteropolysaccharides, in particular xanthan gum or wellan gum, cellulose fibers, dispersants, cement plasticizers, setting accelerators, solidification accelerators, setting retardants, air-entraining agents, polycarboxylates, polycarboxylate ethers, polyacrylamides, completely and/or partly hydrolyzed and optionally modified polyvinyl alcohols, polyvinylpyrrolidones, polyalkylene oxides and polyalkylene glycols, the alkylene group typically being a $C_2$- and/or $C_3$-group, including block copolymers, dispersions and copolymers containing dispersion powders, such as, for example, based on vinyl acetate, ethylene-vinyl acetate, ethylene-vinyl acetate-vinyl versatate, ethylene-vinyl acetate-(meth)acrylate, ethylene-vinyl acetate-vinyl chloride, vinyl acetate-vinyl versatate, vinyl acetate-vinyl versatate-(meth)acrylate, vinyl versatate-(meth)acrylate, pure (meth)acrylate, styrene-acrylate and/or styrene-butadiene, water repellents, such as silanes, silane esters, siloxanes, silicones, fatty acids and/or fatty acid esters, thickeners, fillers, such as quartzitic and/or carbonatic sands and/or flours, such as, for example, quartz sand and/or limestone powder, carbonates, silicates, phyllosilicates, precipitated silicas, light fillers, such as hollow microspheres comprising glass, polymers, such as, for example, polystyrene spheres, aluminosilicates, silicon oxide, aluminum silicon oxide, calcium silicon hydrate, silicon dioxide, aluminum silicate, magnesium silicate, aluminum silicate hydrate, calcium aluminum silicate, calcium silicate hydrate, aluminum iron magnesium silicate, calcium metasilicate and/or volcanic slag and pozzolana, such as metakaolin and/or latently hydraulic components may be added as additives. Very especially preferred additives are polymer dispersions, dispersion powders, polysaccharide ethers, plasticizers and water repellents, in particular silanes, silane esters, fatty acids and/or fatty acid esters.

The present invention also relates to a process for the preparation of mixtures according to the invention but, in which in a first step, at least 10% by weight of at least one organic polymer dissolved in water and according to (i) or (iii), based on the total amount of organosilicon compounds, are mixed with at least one organosilicon compound according to (ii) or (iv), any remaining amount of organic polymer being added during and/or after the dispersing, optionally further additives being added before, during and/or after the dispersing and in a second step, the dispersion obtained in the first step is dried, it being possible to add further additives during and/or after the drying.

The mixtures according to the invention are prepared by a process according to the invention, in which, in a first step, at least 10% by weight, preferably at least 20% by weight, of the organic water-soluble polymer, based on the total amount of organosilicon compound, are mixed with the organosilicon compound. This step is carried out as a rule in water, the organic polymer being dissolved in water beforehand. Any remaining amount of organic polymer is added during and/or after the dispersing or emulsification. It is often advantageous if the mixing is carried out with stirring, as a rule relatively high shear forces being preferred. This process step can be effected batchwise, continuously, such as, for example, via static mixers, or semicontinuously, both at room temperature and at elevated temperature. Thus, the present starting materials can be stirred, dispersed or emulsified in the first step of the process according to the invention in order to be able to prepare a composition as a basis for the second process step.

In another preferred embodiment, the organosilicon compound is dispersed beforehand using nonionic, cationic and/or anionic emulsifiers, the dispersion obtained then being mixed with the organic water-soluble polymer.

It is also possible to add further additives before, during and/or after the dispersing, and it may be useful if a pH buffer, such as, for example, sodium carbonate or sodium bicarbonate is also added to the aqueous phase. Further suitable additives are, for example, antifoams and/or wetting agents, low molecular weight polyalkylene glycols, fatty acids and/or fatty acid derivatives.

If the organosilicon compound has a somewhat high viscosity, so that exact metering is complicated at room temperature, said organosilicon compound may also be heated in order to simplify the metering and the dispersing. Alternatively, a diluent may also be added beforehand to the organosilicon compound in order to adjust the viscosity, it often being preferred if this diluent is then removed again, for example by distillation. A low-viscosity organosilicon compound which need not be removed can be used as the diluent.

The dispersion obtained is then usually dried, it being possible to add further additives during and/or after the drying, the drying preferably being effected by means of spray drying, freeze drying, fluid-bed drying, drum drying, granulation or high-speed drying, and spray drying being particularly preferred, and it being possible to effect the spraying, for example, by means of a spray wheel or a one-fluid or multi-fluid nozzle. It is often useful if antiblocking agents and/or fillers, such as aluminum silicates, colloidal silica gel, pyrogenically produced silica, ground clays, perlites, vermiculites, ground gypsum pigment, talc, cements, chalk powder, calcium/magnesium mixed carbonates and/or diatomaceous earth, are added during and/or after the drying.

If necessary, the aqueous dispersion can for this purpose also be diluted with water in order to obtain a viscosity suitable for the drying. In principle, the drying temperature is not subject to any substantial limits. Particularly with regard to safety considerations, however, it should not as a rule exceed about 200° C., and in particular about 180° C. In order to achieve sufficiently efficient drying, temperatures of about 110° C. or higher, in particular about 120° C. or higher, are preferred. The exit temperature of the gas stream formed during the drying is as a rule from about 40° C. to 100° C., in particular from about 50° C. to 90° C.

The process according to the invention can furthermore comprise the addition of further additives, said additives, depending on type and/or process engineering possibilities, for example, first being mixed with the organic component and/or with the water-soluble organic polymeric protective colloid, added to the aqueous dispersion obtained and/or mixed as a powder with the resulting powder during and/or after the drying. Liquid additives can, however, also be sprayed onto the powder during or after the drying. Preferably, the liquid and/or water-soluble additives are added before, during or after the dispersing, and pulverulent additives are preferably mixed with the resulting powder during or after the drying.

If another dispersion is likewise to be dried, it is possible to mix the dispersions to be dried with one another prior to the drying and to spray and to dry them together, to spray them simultaneously and separately via a two-fluid or multifluid nozzle and then to dry them simultaneously together or rather to spray the two dispersions separately and then to mix the resulting powders with one another.

The mixtures according to the invention are used in particular in and on materials which contain at least one mineral binder, in particular a hydraulically setting binder. Furthermore, they are used for protecting metal, building materials, building blocks, components and/or structures from corrosion, relevant metal being surrounded as a rule by mineral building materials. The mixtures according to the invention are also suitable for hydrophobization of such materials as well as for consolidating stones.

The materials containing at least one mineral binder are preferably concrete, in particular reinforced concrete, expanded concrete, gas concrete, fiber concrete, steel fiber concrete, cellular concrete, air-placed concrete, underwater concrete, rolled concrete, spun concrete, vacuum concrete, self-compacting concrete (SCC), floor-topping concrete, chip concrete, drain concrete, foamed concrete, prefabricated components comprising concrete, high-strength and ultra high-strength concrete and/or glass foam concrete, brick, terracotta, renders, such as gypsum and/or lime and/or cement renders, mortar, in particular dry mortar, such as repair mortar and full thermal protection mortar, joint and tile adhesive, plywood mortar, mortar for adhesive-bonded joints, cementitious parquet adhesives, cement primers, leveling and/or filling compounds, slurry seal-coatings, powder paints and concrete paints, such as, for example, slurries for coating steel or for repairing reinforced concrete in concrete renovation.

The mixtures according to the invention can be applied to any substrates in order to protect them from corrosion. Non-limiting examples of such substrates are mineral building materials, building blocks, components and/or structures, in particular if they are in contact with metal or surround or enclose metal, mineral building materials, such as concrete, lime-sand brick, granite, lime, gypsum, marble, perlite, clinker, porous tiles and clay wall tiles, natural stone, screed, clay articles, but also cast stone, masonry, facades, roofs and structures, such as bridges, harbors, residential buildings, industrial buildings and buildings used by the public, such as multistory car parks, railway stations or schools, but also prefabricated parts, such as railway sleepers and/or L-shaped stones.

The mixtures according to the invention can also be used as compositions or in formulations for stone consolidation and as compositions or in formulations for hydrophobization and for protection from water damage.

The mixtures according to the invention can also be used for coating cables, in particular for insulating cables, and/or for the hydrophobization of cable surfaces.

The present invention also relates to formulations or compositions containing the mixtures according to the invention, in particular those which contain at least one mixture according to the invention or at least one mixture according to the invention and water or which are based thereon. The mixture is used as a rule in a concentration of from 0.01 to 25% by weight, in particular from about 0.1 to 10% by weight and preferably from about 0.2 to 5% by weight, based on the solids content of the formulation or composition, it being necessary to ensure that any standard specifications are complied with.

Formulations or compositions according to the invention are for example—but not exclusively—repair mortar, cement-based sealing compounds, grouts, concrete, in particular reinforced concrete, expanded concrete, gas concrete, fiber concrete, steel fiber concrete, cellular concrete, air-placed concrete, underwater concrete, rolled concrete, spun concrete, vacuum concrete, self-compacting concrete (SCC), floor-topping concrete, chip concrete, drain concrete, high-strength and ultra high-strength concrete, glass foam concrete, terracotta, gypsum and/or lime and/or cement renders, repair mortar and full thermal protection mortar, and tile adhesives, leveling and filling compounds, slurry seal-coatings, powder paints and concrete paints, but also aqueous dispersions or solutions containing the mixture.

Substrates obtainable in advantageous manner according to the invention, i.e. building materials, building blocks, components or structures, which are based on a formulation according to the invention, a composition according to the invention or a mixture according to the invention are therefore likewise a subject.

The invention also relates to articles which are based on a substrate according to the invention. Examples are articles comprising prefabricated concrete parts, such as prefabricated houses, tunnels, bridges, roads, house facades and containers.

In addition, the present invention therefore furthermore relates to a mixture which is obtainable by the process according to the invention.

The mixtures according to the invention, if they are in powder form, are surprisingly distinguished by particularly good handling properties and storability in combination with good flowability, with the result that they can be readily metered into other formulations which may be liquid, pasty or pulverulent.

Furthermore, the mixtures used according to the invention and the mixtures according to the invention surprisingly show excellent dispersing, redispersing or dissolution behavior in water and very good wettability, with the result that they can be very readily stirred into the materials. If the mixture is pulverulent, it can ideally be dispersed, redispersed or dissolved directly on contact with water within a few seconds, if need be by gentle stirring. In certain cases, it is also possible that somewhat stronger shear forces are necessary. In any case, as a rule the shear forces occurring during normally performed stirring processes for dry mortars are sufficient to completely disperse or redisperse the powder according to the invention, with the result that the particle size of the aqueous dispersion prior to drying and homogeneous distribution in the material are achieved.

Although, in the case of the mixtures according to the invention, the generally liquid organosilicon compound is enclosed by the water-soluble organic polymer in such a way that the organosilicon compound remains encapsulated even during and after a drying step, it was surprisingly found that it can fully display its effect when used together with the mineral binder and water. Moreover, the water-soluble organic polymer does not as a rule interfere during as well as after the production of the building materials and with regard to the further properties of the fresh concrete/fresh mortar as well as with regard to the cured system. On the contrary, it even advantageously results in very good processability, wettability, good dispersibility and/or redispersibility. Moreover, the water-soluble polymer can also act as a binder, with the result that the physical strengths of the set building materials are increased.

Thus, the mixtures according to the invention are advantageously also distinguished by a particularly uniform distribution and surprisingly show a particularly corrosion-inhibiting effect in the structure and good alkali stability of the building material. In addition, even harmful chloride ions and other harmful substances dissolved in water, such as, for example, sulfates, which can lead to ettringite formation, are kept away from the building material. They are therefore particularly suitable for the production of various structures and for the repair and restoration of structures or components, a further substantially improved corrosion protection both of the steel or metal reinforcements surrounded by building material and of building blocks or structures in comparison with compositions customary on the market being obtained by the use of such mixtures in mineral-setting materials.

In addition, it is particularly surprising that, over and above the customary hydrophobization effect with the use of water-repellent silane products, in particular the corrosion properties of building blocks, components or structures and corresponding steel or metal reinforcements can be even more substantially improved by the use of a mixture according to the invention—also compared with corrosion protection measures customary on the market.

The present invention is illustrated in more detail by the following examples without limiting the subject matter.

EXAMPLES

Example 1

Preparation of Powder 1

100 g of Protectosil® 266 were emulsified in 329.2 g of a 24% strength by weight aqueous solution of a polyvinyl alcohol having a degree of hydrolysis of 88 mol % and a Höppler viscosity, as a 4% strength solution, of 4 mPa·s using a propeller stirrer at 1000 rpm for 15 minutes and then diluted with water to a solids content of 25% by weight. This mixture was sprayed on a laboratory spray tower with a two-fluid nozzle by means of compressed air at an inlet temperature of 120° C. and dried. 0.6% by weight of a pyrogenic silica and 9.4% by weight of a commercially available carbonate, based on the prepared powder, were added as anticaking agent. A free-flowing, readily water-redispersible white powder which does not become greasy even when rubbed between the fingers and hence contains the propylalkoxysiloxane mixture used in well encapsulated form was obtained in good yield.

Example 2

Preparation of Powder 2

Example 1 was repeated, the prepared mixture not being diluted with water. The solids content was 37.9% by weight and the Brookfield viscosity, measured using spindle 3 at 20 rpm and 25° C., was 1590 mPa·s. The spray drying was effected by means of an atomizer disk at an entrance temperature of 150° C. A free-flowing, readily wettable and readily redispersible white powder which, when stirred with water, disintegrates into the primary particles within a short time was obtained in good yield.

Example 3

Preparation of Powder 3

200.0 g of a 50% strength by weight aqueous emulsifier-stabilized emulsion of Protectosil® 266 were mixed with 329.2 g of a 24% strength by weight aqueous solution of a polyvinyl alcohol having a degree of hydrolysis of 88 mol %, and a Höppler viscosity, as a 4% strength solution, of 4 mPa·s, analogous to Example 2, diluted, dried and mixed with anticaking agent. A free-flowing, readily wettable and readily redispersible white powder which does not become greasy even when rubbed between the fingers and hence contains the siloxane used in well encapsulated form was obtained.

Example 4

Preparation of Powder 4

40 g of a liquid silane based on isobutyltriethoxysilane were emulsified in 595.7 g of a 24% strength by weight aqueous solution of a polyvinyl alcohol having a degree of hydrolysis of 88 mol % and a Höppler viscosity, as a 4% strength solution, of 4 mPa·s using a propeller stirrer at 1000 rpm for 15 minutes and then diluted with water to a solids content of 25% by weight. This mixture was sprayed on a laboratory spray tower with a two-fluid nozzle by means of compressed air at an inlet temperature of 120° C. and dried. 0.6% by weight of a pyrogenic silica and 9.4% by weight of a commercially available carbonate, based on the prepared powder, were added as anticaking agent. A free-flowing, readily wettable and readily redispersible white powder which does not become greasy even when rubbed between the fingers and hence contains the silane formulation used in well encapsulated form was obtained in good yield.

Example 5

Preparation of Powders 5 to 10 According to EP 0 228 657

Analogously to the examples described in EP 0 228 657, the corresponding polysiloxanes or silanes (cf. Table 1) were dispersed or emulsified in aqueous polyvinyl alcohol solution (24.3% by weight solution of a polyvinyl alcohol having a degree of hydrolysis of 88 mol % and a Höppler viscosity, as a 4% strength solution, of 4 mPa·s) and diluted with water to a nonaqueous fraction of 40% by weight. The stability of the spray batches was assessed after 2 and 12 h. The resulting supernatant in cm is stated as a stability criterion in Table 3. After stirring up beforehand, the spray batches were then sprayed in a laboratory spray dryer (entrance temperature 135° C., exit temperature 76° C.) by means of a two-fluid nozzle (air pressure 3.5 bar) and dried.

TABLE 1

| Example No. | 5a | 5b | 5c | 5d | 5e | 5f |
|---|---|---|---|---|---|---|
| Powder No. | 5 | 6 | 7 | 8 | 9 | 10 |
| Example from EP228657 | 3[a] | 1[a] | 5[a] | 7[a] | 11 | 10 |
| Siloxane fraction | 80% | 90% | 95% | 90% | 90% | 90% |
| PVOH fraction | 20% | 10% | 5% | 10% | 10% | 10% |
| Stability after | | | | | | |
| 2 h | 0 | 0.1 | 1.5 | 0 | 0 | 0 |
| 12 h | 0 | 1.0 | 3.5 | 0.5 | 0.1 | 0.5 |
| Yield | moderate | poor | very poor | N/A[b] | N/A[b] | N/A[b] |

[a]Instead of the methylsiloxane, the corresponding propylsiloxane was used
[b]Owing to the poor yield of powders 5-7, these mixtures were not sprayed.

Except for example 5a with 20% of polyvinyl alcohol, the spray batches were not stable and were therefore stirred up prior to spray drying. Owing to the poor sprayability, only examples 5a-5c were dried.

The yields decline drastically with decreasing PVOH content and a greasy wall coating is increasingly obtained in the spray tower. The powders, too, are greasy when rubbed between the fingers, which shows that the polysiloxane is not properly encapsulated.

The spray batches and powders prepared according to the teaching of EP 0 228 657 clearly show that their properties with regard to spray batch stability and sprayability are not very advantageous. Moreover, they show very poor wettability and considerably slow redispersibility, which substantially complicates the use in building materials. Thus, powders based on these compositions must be prepared in a more complicated process. If, however, the preparation process and additives introduced, if desired, in addition are chosen so that the powders obtained meet the requirements with regard to storability, wettability and redispersibility, such compositions can also be used for the inventive use.

Example 6

Investigations of Performance Characteristics

Determination of the Water Absorption Coefficient of a Cement/Sand Mortar

For assessing the corrosion-inhibiting and, if desired, hydrophobizing effect of the powders in comparison with the liquid starting material, the water absorption coefficient was determined after 24 hours on the basis of DIN 52617.

A base mortar mix consisting of 25% by weight of Portland cement CEM I 42.5 N and 75% by weight of standard sand according to DIN EN 196—1 was mixed in each case with the active substance stated in Table 2 and stirred with 12% by weight of water, based on the dry formulation, using a 60 mm propeller stirrer at a speed of 950 rpm for 60 seconds. After a maturing time of 3 minutes, the mortar was briefly stirred up again by hand and then introduced into annular plastic molds having a diameter of 8 cm and a height of 2 cm and the surface was scraped off with a spatula to the height of the mold. The test specimens were stored for 14 days at 23° C. and 50% relative humidity, said test specimens being removed from the mold after the first day. After weighing the test bodies, the latter were stored in water for 24 hours and then weighed again after superficially adhering water had been removed by drying. The water absorption coefficient $\omega_{24}$ was then calculated according to DIN 52617 from the weight difference, the surface area of the test bodies and the duration of storage in water. The experiments were carried out with an active substance containing liquid silane, as well as with the powders used according to the invention. No significant change in the setting behavior was observed.

TABLE 2

Water absorption coefficient $\omega_{24}$ of powders 3 and 1 in comparison with active substance used in liquid form and without PVOH in a cement/sand mortar after storage in water for 24 hours. The water absorption coefficient was determined according to DIN 52617 and is stated in $[kg/m^2 \ast h^{0.5}]$. The metered amount was adjusted so that the amount of active substance, based on amount of silane or siloxane, was in each case 1.8% by weight, based on the solids content of the mortar mix used.

| | Water absorption coefficient $\omega_{24}$ | |
|---|---|---|
| Active substance from example | Liquid | Powder |
| 3 | 0.031 | 0.049 |
| 1 | 0.025 | 0.031 |

With powder 2, the water absorption coefficient was determined as described above, but a mortar comprising a base mortar mix consisting of 34% by weight of Portland cement CEM I 42.5, 59.8% by weight of 0.1 to 0.5 mm quartz sand, 3% by weight of slaked lime, 0.2% by weight of cellulose ether Tylose MH 10007 P4 and 3% by weight of a redispersion powder based on an ethylene-vinyl acetate copolymer was used and was stirred with 22% by weight of water.

TABLE 3

Water absorption coefficient $\omega_{24}$ of powder 2 in mortar (cf. text) after storage in water for 24 hours. The water absorption coefficient was determined according to DIN 52617 and is stated in $[kg/m^2 \ast h^{0.5}]$.

| | Water absorption coefficient $\omega_{24}$ |
|---|---|
| Without additive | 0.269 |
| 0.5% by weight of powder 2 | 0.196 |

The results from Table 2 clearly show that the polyvinyl alcohol used for spraying has no substantial influence on the water absorption of the hardened mortar and hence on the water absorption coefficient. Moreover, the values from Table 3 show that even very small amounts of the inventive powder result in a substantial reduction in the water absorption. The chloride penetration in chloride-containing water is also reduced thereby, which additionally makes any steel corrosion impossible or at least substantially retards said corrosion.

Example 7

Determination of the Corrosion-Inhibiting Effect of Powders on the Basis of Laboratory Tests The aim of the investigation was to quantify the inhibitor efficiency in laboratory investigations. The use of standard methods (for example testing according to ASTM) is not feasible in this case since specific properties, especially of powders based on silicon compounds, do not come into effect or come into effect only to a small extent. The effect of cyclic weathering with dry and wet periods was therefore investigated in the laboratory. Under these circumstances, dry-out effects of the concrete which influence the corrosion may take place.

The use of prefabricated concrete cubes having a side length of 15 cm, which are equipped with three sensors each for monitoring the corrosion rate and the corrosion state, permits the continuous detection of the corrosion behavior. The concrete formulation used and the production conditions are listed in Tables 2 and 3. The test body for carrying out the corrosion experiments is shown schematically in FIG. 1.

TABLE 4

Formulation of the concrete used with the use of Portland cement CEM I.

| Formulation | Water [kg/m3] | Cement [kg/m3] | Aggregate [kg/m3] | | |
|---|---|---|---|---|---|
| | | | 0-4 mm | 4-8 mm | 8-16 mm |
| Concrete w/c 0.6 Largest particle ø 16 | 210 | 350 | 895 | 358 | 537 |

Figure 1:
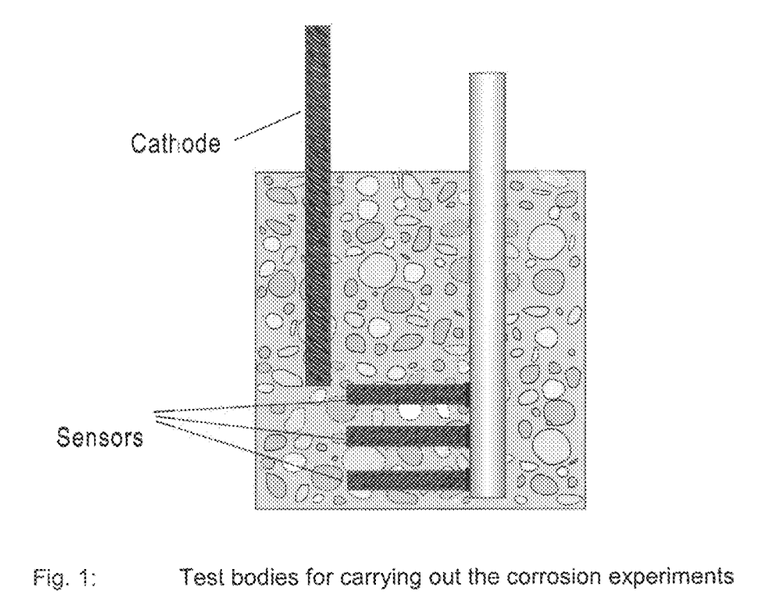
FIG. 1 shows schematically the test body for carrying out the corrosion experiments where only one electrode is depicted.

3 reinforcing bars having a diameter of 8 mm and a length of 45 mm were installed as sensors. The concrete covering thereof was 10 mm, 28 mm and 46 mm. For the measurement of the corrosion current, these sensors were each connected to a cathode (only one cathode is shown in FIG. 1).

The weathering as occurs in the course of seasonal stresses were simulated by wet/dry cycles with 5 days at 35° C. and 2 days of immersion in electrolyte solution. The wet/dry cycles carried out in the course of the experiments usually occur in the case of structures only once or twice per year. The penetration of chlorides can therefore be simulated in greatly accelerated form under these experimental conditions (2 weeks would correspond to about 1 year here).

2 different sample bodies were produced with powder 1 from example 1. The test bodies P1 and P2 were produced with a powder content of 2% (P1) and 4% (P2), respectively, based on the cement content, with the use of the concrete composition from Table 4. The amount of powder used corresponds to an active substance content, based on the organosilicon compound, of 1% by weight and 2% by weight, respectively.

The sample bodies were removed from the mold after 4 days and then stored for 7½ weeks at 100% relative humidity at room temperature. The cyclic treatment of the samples was then begun, the samples each being immersed in aqueous 1 M NaCl solution.

Figure 2A:
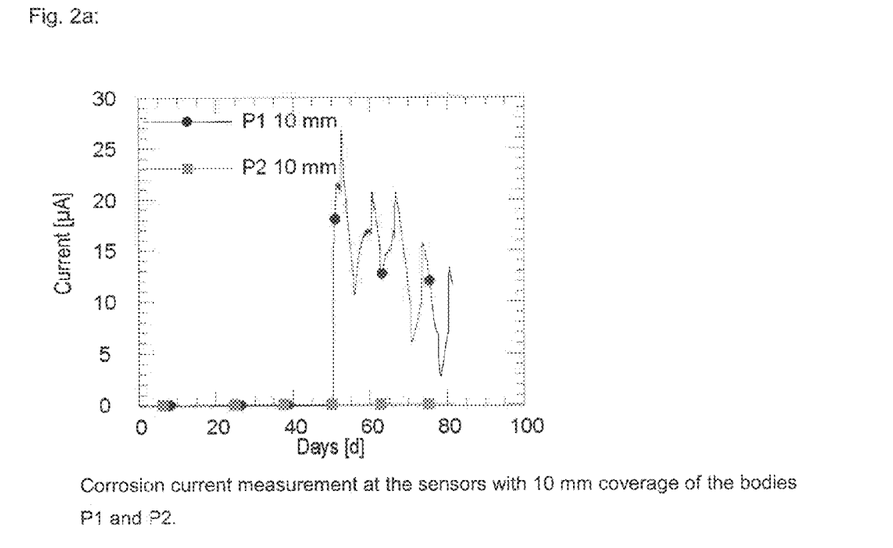
FIGS. 2a and 2b show the corrosion current curves of these sample bodies at the sensors.
Figure 2B:
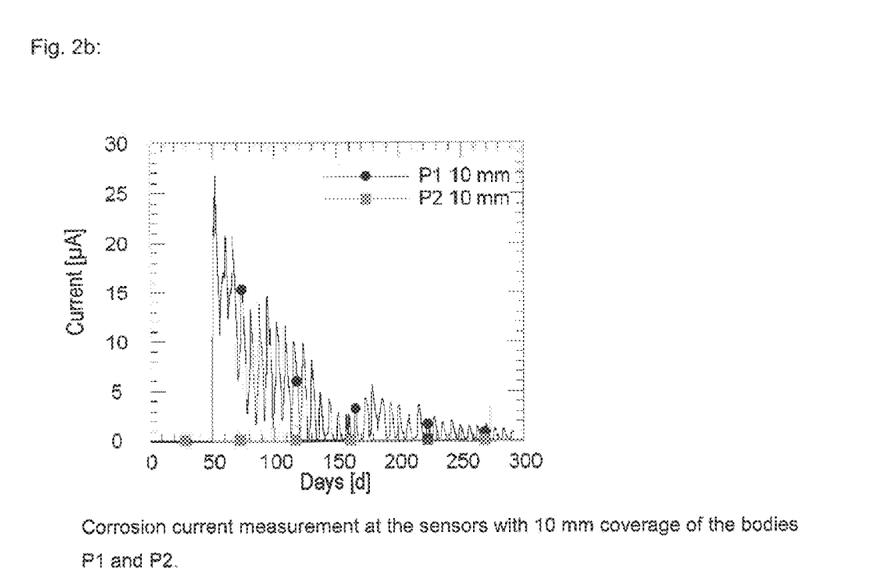

FIGS. 2a and 2b show the corrosion current curves of these sample bodies at the sensors with 10 mm covering of the bodies P1 (with 2% by weight of powder 1) and P2 (with 4% by weight of powder 1). The sample body P2 shows no corrosion. In contrast, the activation of corrosion was observed at reference body P1 at the lowermost reinforcement position (10 mm). The body P1 shows a certain reduction in the corrosion rate in the course of time, which might be attributable to a certain inhibiting effect. On the basis of the present data, however, a powder concentration of 2% by weight must be assessed as being too low for an effective corrosion protection effect. An active substance concentration of the silicon compound of about 2% by weight (with 4% by weight of powder 1), based on the cement content, clearly has on the other hand a corrosion-inhibiting effect.

The invention claimed is:

1. A water-dispersible, -redispersible or -soluble mixture comprising
    (iii) at least one water-soluble organic polymer and
    (iv) at least one organosilicon compound having at least a Si—O—Si bond,
    wherein a content of the organic polymer (iii) is from 40 to 80% by weight based on the sum of organic polymer (iii) and organosilicon compound (iv);
    the organosilicon compound (iv) comprising an oligomer mixture of alkylalkoxysiloxanes, wherein the oligomer mixture comprises from 50 to 100% by weight of alkylalkoxysiloxanes, wherein the alkylalkoxysiloxanes have a degree of oligomerization of from 2 to 20;
    wherein the oligomer mixture of alkylalkoxysiloxanes satisfies empirical formula I $$(R'')Si(OR''')_xO_y \qquad (I),$$

where groups R'' are identical or different and R'' is a linear, branched or cyclic alkyl group having 1 to 18 C atoms; groups R''' are identical or different and R''' is a hydrogen or a linear or branched alkyl group having 1 to 4 C atoms; $1.0<x<2.0$; $0.5<y<1.0$; and $(2y+x)=3$.

2. A substrate comprising a water-dispersible, -redispersible or -soluble mixture according to claim 1.

3. The substrate according to claim 1, wherein the substrate is a metal and natural and/or manufactured mineral building material.

4. The substrate according to claim 3, wherein the mineral building material comprises the mixture.

5. The mixture according to claim 1, wherein the oligomer mixture of alkylalkoxysiloxanes comprises from 70 to 100% by weight of alkylalkoxysiloxanes having a degree of oligomerization of from 2 to 10.

6. The mixture according to claim 1, wherein the water-soluble organic polymer is at least one of a synthetically prepared polymer having a degree of hydrolysis of from 70 to 100 mol % and a Höppler viscosity, as a 4% strength aqueous solution, of from 1 to 50 mPa·s (measured at 20° C. according to DIN 53015), a polyvinylpyrrolidon, a polyacrylate, a polyalkylene oxide and a polymaleate.

7. The mixture according to claim 1, wherein the water-soluble organic polymer is a natural and/or synthetically prepared biopolymer which is optionally synthetically modified.

8. The mixture according to claim 1, wherein the water-dispersible or -redispersible mixture, when it is dispersed or redispersed in water, has a mean particle size of from about 0.1 to 50 μm.

9. The mixture according to claim 1, wherein the water-dispersible or -redispersible or -soluble mixture has a mean particle size of from about 20 to 500 μm.

10. The mixture a according to claim 1, wherein the mixture further comprises an additive comprising a, water repellent, a fatty alcohol, a silane, an air-entraining agent, a wetting agent, an antifoam, an emulsifier, a film formation auxiliary, a setting and solidification accelerator, a setting retardant, a thickener, a dispersant, a rheology control additive, a corrosion inhibitor, a water retention agent, an additive for reducing efflorescence, sedimentation and/or floating, a filler, an additive for reducing powder blocking and film-forming, a water-insoluble dispersion powder and a film-forming polymer dispersion.

11. A process for preparing a mixture according to claim 1, comprising
    (A) mixing at least 10% by weight based on the total amount of organosilicon compounds, of at least one organic polymer of (iii) dissolved in water, with at least one organosilicon compound of (iv), adding any remaining amount of organic polymer during and/or after the dispersing, and optionally further adding additives before, during and/or after the dispersing, and
    (B) drying the dispersion obtained in (A), and optionally further adding additives during and/or after the drying.

12. The process according to claim 11, wherein spray drying, freeze drying, fluid-bed drying, drum drying, granulation or high-speed drying are carried out in (B) for drying.

13. A mineral binder comprising the mixture according to claim 1.

14. The mineral binder according to claim 13 selected from the group consisting of concrete, expanded concrete, gas concrete, fiber concrete, cellular concrete, steel fiber concrete, air-placed concrete, underwater concrete, rolled concrete, spun concrete, vacuum concrete, self-compacting concrete (SCC), floor-topping concrete, chip concrete, drain concrete, high-strength and ultra high-strength concrete, glass foam concrete, terracotta, gypsum, lime, cement render, repair mortar, full thermal protection mortar, joint adhesive, tile adhesive, a leveling compound, a filling compound, a slurry seal-coating, a powder paint and a concrete paint.

15. The mixture according to claim 1, wherein the mixture is a composition in formulations for consolidating stone.

16. A coating cable comprising the mixture according to claim 1.

17. A formulation comprising water and at least one mixture according to claim 1.

18. The formulation or composition comprising at least one mixture according to claim 1, wherein the mixture is present in a concentration of from about 0.1 to about 10% by weight, based on the respective solids content, in the formulation or in the composition.

19. A substrate or article comprising a formulation or a composition according to claim 18.

* * * * *